J. GARDNER.
SINK.
APPLICATION FILED JUNE 3, 1913.
1,090,704.
Patented Mar. 17, 1914.
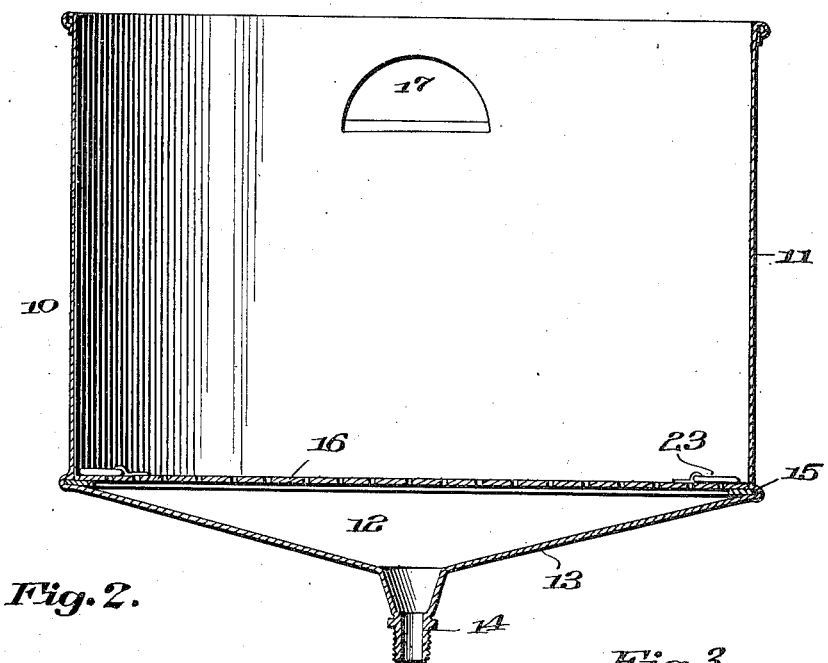
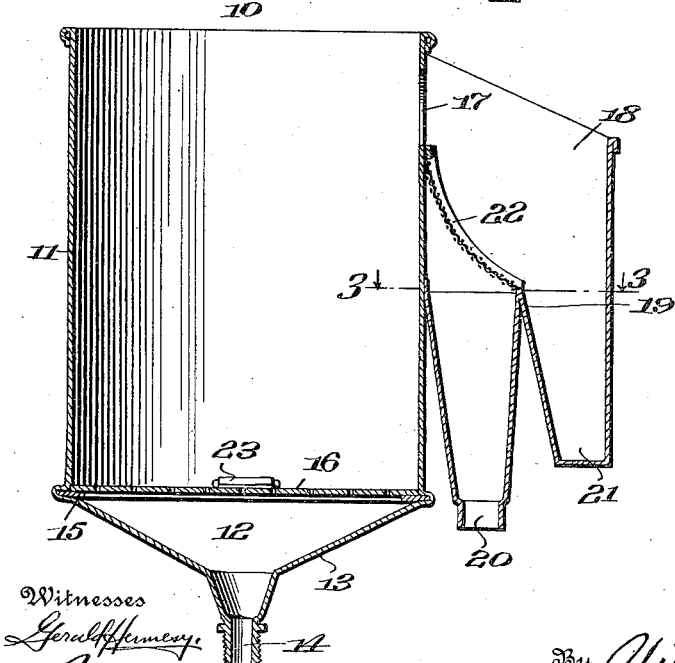
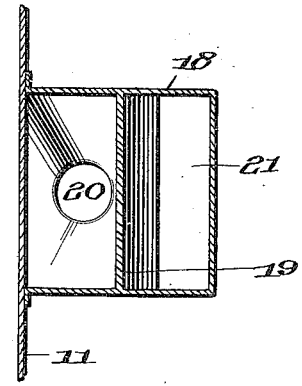
Inventor
Jesse Gardner,
By Victor J. Evans
Attorney
Witnesses

UNITED STATES PATENT OFFICE.

JESSE GARDNER, OF AUSTIN, TEXAS.

SINK.

1,090,704.

Specification of Letters Patent.

Patented Mar. 17, 1914.

Application filed June 3, 1913. Serial No. 771,454.

*To all whom it may concern:*

Be it known that I, JESSE GARDNER, a citizen of the United States, residing at Austin, in the county of Travis and State of Texas, have invented new and useful Improvements in Sinks, of which the following is a specification.

The invention relates to sinks, and more particularly to that class of sinks used in connection with soda fountains and the like.

The invention embodies, among other features, the provision of a basin having suitable connection with a water supply whereby a continuous stream of water can be readily supplied to the basin and which will flow into the basin in a manner calculated to prevent sediment or other foreign matter from clinging to or settling on the bottom or floor of the basin, a suitable drain being provided to carry off the overflow, and a waste receptacle being further provided to catch and hold any foreign matter or waste passing into the drain pipe.

In the further disclosure of the invention reference is to be had to the accompanying drawings, constituting a part of this specification, in which similar characters of reference denote corresponding parts in all the views, and in which:

Figure 1 is a vertical longitudinal sectional view; Fig. 2 is a vertical transverse sectional view; and Fig. 3 is a horizontal sectional view taken on the line 3—3 in Fig. 2.

Referring more particularly to the views, I provide a sink 10 consisting of a receptacle 11 providing a basin 12, the said receptacle having an inclined bottom terminating in a supply pipe 14 adapted to supply water to the receptacle. An inwardly projecting convex flange 15 is formed at the juncture of the receptacle 11 with the bottom 13 and constitutes a seat for a perforated floor 16, the water supplied to the receptacle through the supply pipe 14 being adapted to pass upwardly in the receptacle through the perforations in the floor, as will be readily understood.

The receptacle 11 adjacent its upper edge is provided with an outlet opening 17 and secured to the receptacle on the interior side thereof is a box 18 subdivided by a vertical partition 19 to provide a drain pipe 20 and a waste reservoir 21, with the drain pipe on one side of the partition and the waste reservoir on the other side of the partition, the said partition being common to the drain pipe and to the reservoir. A screen 22 is preferably arranged over the drain pipe 20 and secured to the sides of the box 18, the said screen being of a fine mesh to prevent waste or foreign products passing into the box through the outlet opening 17 from passing into the drain pipe.

Now it will be apparent that when a continuous supply of water flows into the receptacle 11 through the supply pipe 14, the water passing upwardly through the perforations in the floor 16 will prevent any foreign matter or sediment from reposing on the floor and the current produced by the water passing upwardly through the perforations in the floor will tend to circulate the waste products with the water so that as the water passes outwardly through the outlet openings 17 the waste products will also pass outwardly therethrough, but will be prevented from passing into the drain pipe with the water by the screen 22 which is arranged to cover the top of the drain pipe. The drain pipe being immediately adjacent to the outlet opening and the reservoir being adjacent to the drain pipe, it will be apparent that when the water flows through the outlet opening and into the drain pipe the waste products will pass from the screen into the waste reservoir 21, from which they can be conveniently removed.

As mentioned heretofore, the sink described herein is particularly adaptable for use in connection with soda fountains and the like, and preferably is built or constructed as an integral part of the entire fountain, although it will be understood that the sink can be also manufactured for use in kitchens or for various other purposes. By having the floor 16 removable, the floor can be readily cleaned if, through carelessness or neglect, the perforations therein should become clogged and in order to permit of readily removing the floor from the receptacle a plurality of handles 23 are preferably secured to the upper side of the floor adjacent its ends.

Having thus described my invention, I claim:

1. In a sink, the combination with a receptacle constituting a basin, of a supply pipe for connection with the receptacle, a perforated floor supported within the receptacle, a box projecting from the medial portion of the side wall of the receptacle adjacent an outlet opening thereof, and a partition in the box to provide a drain pipe depending adjacent the receptacle, and a waste reservoir lying adjacent the drain pipe.

2. In a sink, the combination with a receptacle constituting a basin, of a supply pipe for connection with the receptacle, a box projecting from a medial portion of the side wall of the receptacle, adjacent an outlet opening thereof, a partition in the box to provide a drain pipe and a reservoir, and a curved screen within the box and having connection with the receptacle and the partition to cover the upper end of the said drain pipe.

In testimony whereof I affix my signature in presence of two witnesses.

JESSE GARDNER.

Witnesses:
TERRELL JACKSON,
R. S. CARSNER.

---

Copies of this patent may be obtained for five cents each, by addressing the "Commissioner of Patents, Washington, D. C."